(12) United States Patent
Haija et al.

(10) Patent No.: US 10,095,858 B2
(45) Date of Patent: Oct. 9, 2018

(54) SYSTEMS AND METHODS TO SECURE INDUSTRIAL SENSORS AND ACTUATORS

(71) Applicant: Maxim Integrated Products, Inc., San Jose, CA (US)

(72) Inventors: Samer A. Haija, San Jose, CA (US); Chowdary Subbayya Yanamadala, Dallas, TX (US); Hal Kurkowski, Dallas, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 86 days.

(21) Appl. No.: 14/223,735

(22) Filed: Mar. 24, 2014

(65) Prior Publication Data

US 2015/0121507 A1    Apr. 30, 2015

Related U.S. Application Data

(60) Provisional application No. 61/896,553, filed on Oct. 28, 2013.

(51) Int. Cl.

| G06F 21/44 | (2013.01) |
| H04L 9/32 | (2006.01) |
| H04L 29/08 | (2006.01) |
| H04L 9/30 | (2006.01) |

(52) U.S. Cl.
CPC ............... *G06F 21/44* (2013.01); *H04L 9/32* (2013.01); *H04L 67/12* (2013.01); *G06F 2211/008* (2013.01); *H04L 9/30* (2013.01)

(58) Field of Classification Search
CPC ........ G06F 21/44; G05B 19/05; G05B 19/058
See application file for complete search history.

(56) References Cited

U.S. PATENT DOCUMENTS

| 8,516,252 B2 * | 8/2013 | Shon | H04L 9/0833 |
| | | | 713/168 |
| 9,154,509 B2 * | 10/2015 | Kim | H04L 63/105 |
| 2002/0068983 A1 * | 6/2002 | Sexton | G05B 19/05 |
| | | | 700/2 |
| 2002/0095573 A1 * | 7/2002 | O'Brien | H04L 63/0823 |
| | | | 713/168 |
| 2006/0090084 A1 * | 4/2006 | Buer | G06F 21/53 |
| | | | 713/189 |
| 2007/0061455 A1 * | 3/2007 | Callaghan | H04L 63/08 |
| | | | 709/225 |
| 2007/0299624 A1 * | 12/2007 | Motobayashi | H04L 63/0428 |
| | | | 702/117 |
| 2008/0250253 A1 * | 10/2008 | Beckwith | H04L 9/3294 |
| | | | 713/189 |
| 2008/0292105 A1 * | 11/2008 | Wan | H04L 9/0825 |
| | | | 380/282 |

(Continued)

*Primary Examiner* — Linglan E Edwards
(74) *Attorney, Agent, or Firm* — North Weber & Baugh LLP

(57) ABSTRACT

Various embodiments of the invention provide for secure data communication in industrial process control architectures that employ a network of sensors and actuators. In various embodiments, data is secured by a secure serial transmission system that detects and authenticates IO-Link devices that are equipped with secure transceivers circuits, thereby, ensuring that non-trusted or non-qualified hardware is prevented from connecting to a network and potentially compromising system behavior.

18 Claims, 4 Drawing Sheets

(56) References Cited

U.S. PATENT DOCUMENTS

| | | | |
|---|---|---|---|
| 2009/0157064 A1* | 6/2009 | Hodel | A61B 18/22 606/10 |
| 2013/0054960 A1* | 2/2013 | Grab | G06F 21/10 713/155 |
| 2013/0159956 A1* | 6/2013 | Verghese | G06F 17/5036 716/122 |
| 2013/0279695 A1* | 10/2013 | Rubin | G08G 9/02 380/255 |

* cited by examiner

SYSTEMS AND METHODS TO SECURE INDUSTRIAL SENSORS AND ACTUATORS

CROSS REFERENCE TO RELATED PATENT APPLICATIONS

This application claims priority to U.S. Provisional Patent Application No. 61/896,553, titled "Systems and Methods to Secure Industrial Sensors and Actuators," filed Oct. 28, 2013, by Samer A. Haija, Subbayya Chowdary Yanamadala, and Hal Kurkowski, which application is hereby incorporated herein by reference in its entirety.

BACKGROUND

A. Technical Field

The present invention relates to data communication networked control systems and, more particularly, to systems, devices, and methods of securing data transmission in industrial process control architectures.

B. Background of the Invention

Industrial network system integrators are tasked with ensuring that networked devices in the factory automation business properly communicate with each other so that they can perform complex functions without introducing unwanted downtime. However, industrial process control architectures oftentimes comprise PLCs from a particular vendor, wherein the PLCs have certain proprietary IO interfaces unique to that vendor, and sensors and actuators from another provider, who uses a different proprietary interface.

Programmable logic controller (PLC) manufacturers and system integrators are primarily concerned with maintaining safety, transparency, and functionality. Sensor manufacturers share these goals, but in addition are often concerned about preventing unauthorized copying of their products and maintaining their reputation.

One approach that system integrators take to ensure interoperability is to employ devices with universal, standardized, network-independent interfaces, such that devices can communicate with each other over standardized communication protocols.

One such standardized communication protocol, which is incorporated herein by reference and will not be described in detail, is IO-Link. IO-Link is a communication protocol that is increasingly employed in process control systems as a fieldbus-independent standard for industrial point-to-point serial processing between a master and a device, for example, to remotely monitor and control smart sensors and actuators. Constant bi-directional communication and access to device-specific information enables remote parameter control and monitoring of networked devices. Data are accessed and exchanged with a standard protocol, standardized cabling (typically with unshielded, three-conductor sensor cables that simplify wiring), and standardized connectors. Increased integration and utilization of sensor and actuator information allows the system to detect and alleviate incidents in a process faster and more effectively. Thus, a high level of productivity and transparency can be maintained in automation facilities and other networks. Backward compatibility with conventional 24 V DI/DO devices adds to the attractiveness of IO-Link to system integrators.

However, IO-Link, like other traditional systems, provides no mechanism for authentication. A sensor or actuator device is typically connected to a host via a powered cable; the host interrogates the device in order to determine how to communicate with and drive the device. Due to fairly simple, handshake-type communication present in existing networks that lack authentication mechanisms and other security features, nothing prevents a sensor or actuator from falsely signaling compatibility with any other device or exhibiting a different behavior during operation than is expected.

What is needed are tools for system designers to overcome the above-described limitations.

SUMMARY OF THE INVENTION

The disclosed systems and methods enable secure data communication in a network of sensors and actuators by using a secure serial transmission system. Various embodiments of the invention provide security at an individual sensor or actuator level by facilitating authentication of IO-Link devices using secure sensor transceivers circuits. In some embodiments, functions and components are embedded within the same die or on a separate die in a package.

Various embodiments integrate a secure authentication feature with an IO-Link device transceiver and a master transceiver so as to enable encryption of the transceiver path depending on a level of authentication.

In certain embodiments, the presence of a device that comprises an IO-Link secure transceiver is detected by sending an authorization request from an I/O-Link secure master transceiver to the device and validating a response prior to enabling transmission via a secure communication channel.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document industry and industrial mean manufacturing and other automation industry. The terms "IO-Link secure master transceiver," "IO-Link master transceiver," and "master transceiver" are used interchangeably.

Figure 1:
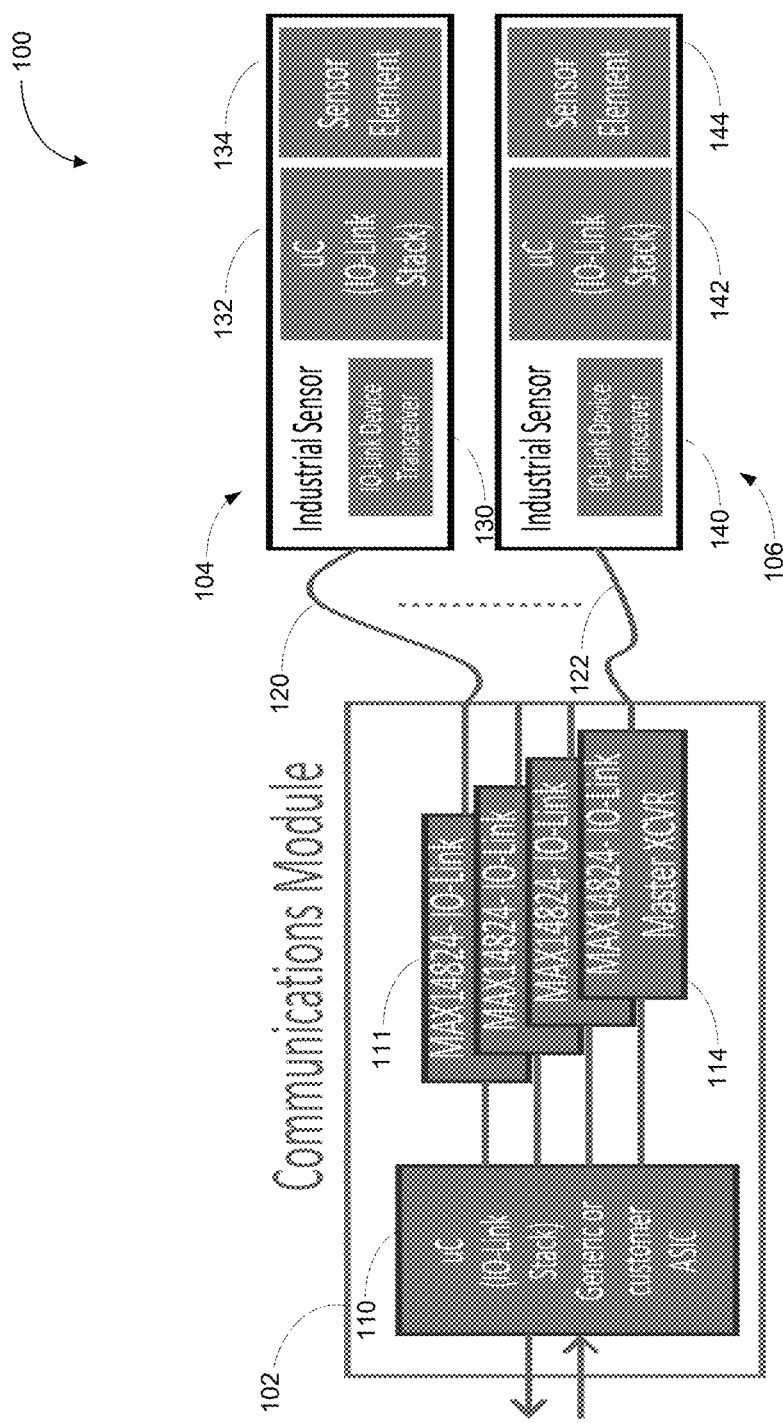
FIG. 1 is a prior art bi-directional communication system utilizing a standard IO-Link interface.

FIG. 1 is a prior art bi-directional communication system utilizing a standard IO-Link interface. System 100 comprises communication module 102, sensor 104, 106, cable 120-122. Communication module 102 comprises microcontroller 110 and transceiver 111-114. Microcontroller 110, 132, 142 includes a processor that processes data and stores it in a memory (not shown). In operation, microcontroller 110 communicates with sensor 104, 106 via transceiver 111-114 of communication module 102 and cable 120-122, while microcontroller 132, 142 communicates with communication module 102 via transceiver 130 and 140 to control sensor elements 134 and 144, respectively. Microcontroller 110 sends sensor data to a PLC (not shown). Communications module 102 communicates sensor information provided by sensor 104, 106 to the PLC. Sensor elements 134, 144 are typically remote sensors that measure a physical property, such as temperature, and generate a voltage that is representative of the temperature.

However, non-trusted or non-qualified devices may freely connect to the network and potentially compromise the behavior of system 100. Therefore, it would be desirable to prevent potential issues by ensuring that only authorized hardware is permitted to couple to and operate with any given process control architecture.

Figure 2:
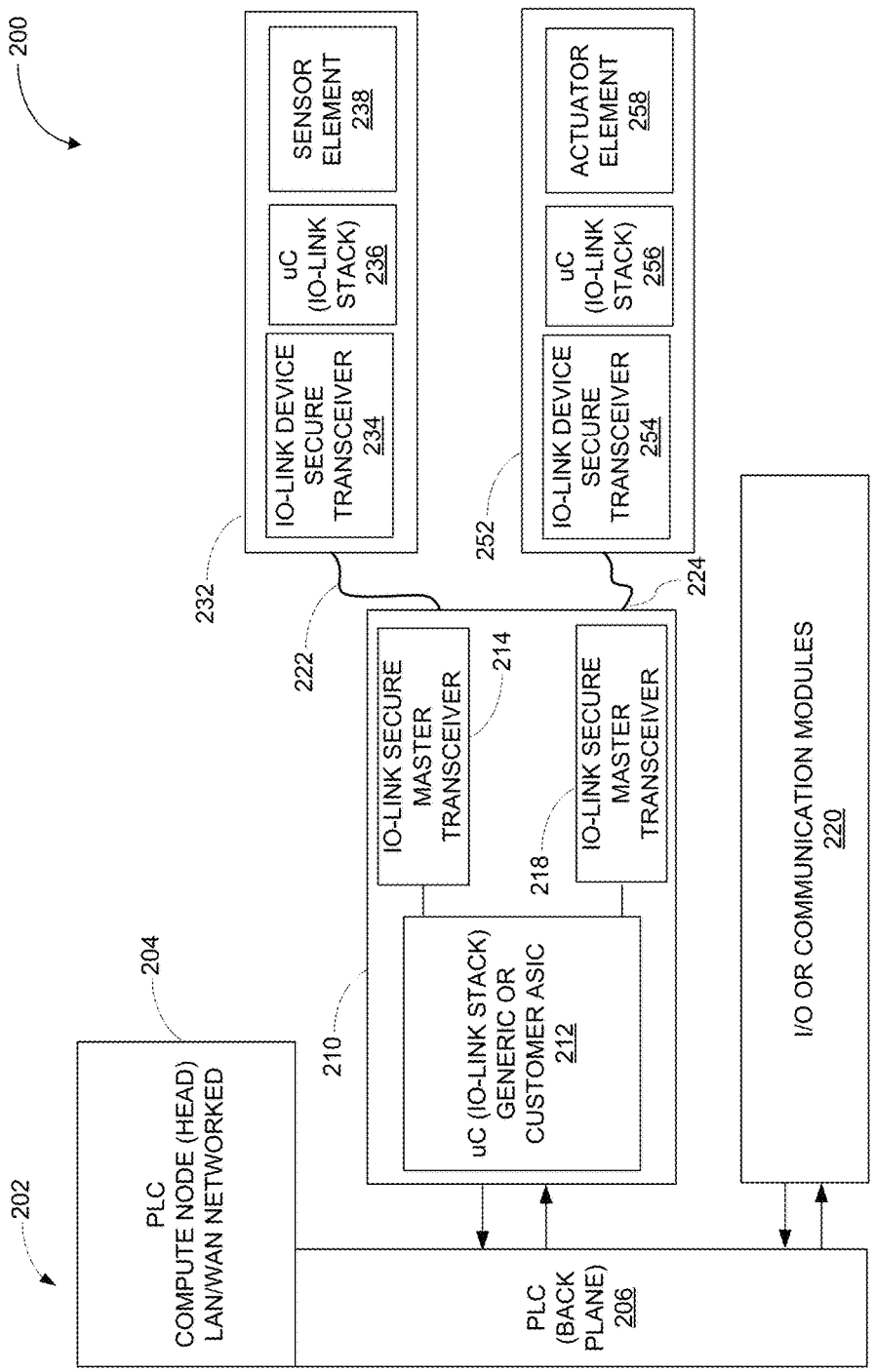
FIG. 2 is an exemplary block diagram of an IO-Link system architecture utilizing IO-Link device authentication, according to various embodiments of the invention.

FIG. 2 is an exemplary block diagram of an IO-Link system architecture utilizing IO-Link device authentication, according to various embodiments of the invention. Architecture 200 is a communications system comprising programmable logic controller (PLC) module 202, communications module 210, 220, and IO-Link device 232, 252. Architecture 200 is typically part of an automated industrial process control network that operates at a 24 V level to exchange digital or analog signals, such as commands between PLC module 202 and IO-Link device 232, 252.

As shown in FIG. 2, PLC module 202 comprises PLC compute node 204 and PLC 206. PLC compute node 204 may be a centrally located programmable controller that is coupled to control a network of one or more PLCs 206. PLC compute node 204 may be networked in a LAN or WAN and be configured to set and modify parameters of IO-Link device 232, 252.

PLC 206 comprises multiple I/O paths that handle a plurality of analog and/or digital communication modules 210, 220. PLC 206 may be implemented into a system backplane bus board (e.g., a serial bus) with decentralized peripheral buses that are used for intercommunication and/or to transfer power. PLC 206 may provide power to communications module 210, 220 and/or be isolated from communications modules 210, 220, for example, by optocouplers.

Communications module 210, 220 is an IO-Link that facilitates ease of connectivity of IO-Link device 232, 252. In the example in FIG. 2, communication module 210 is a master unit that comprises microcontroller 212 and IO-Link master transceiver 214-218. Communications module 210, 220 is coupled to IO-Link device 232, 252 via cable 222, 224, which bi-directionally routes data to appropriate destinations. Data includes configuration data (e.g., device settings, hardware configuration), process data (e.g., measurement values, command signals, diagnostic data), specific information regarding the device (e.g., manufacturer model number, technical descriptions), and other data (e.g., industrial security functions) that aids the system integrator. Microcontroller 212 is a generic or a proprietary ASIC comprising memory (not shown) to store data that is transmitted over the serial link comprising IO-Link device 232, 252.

Cable 222-224 represents a secure communication channel between communications module 210 and IO-Link device 232, 252. However, this is not intended as a limitation. Communication may occur over any suitable wired or wireless communication network, including Wi-Fi, etc. In one embodiment, cable 222, 224 is a standardized three-conductor cable with high, low, and ground wires that forms a serial link in which each IO-Link device 232, 252 represents a node.

IO-Link secure master transceiver 214-218 is a transceiver configured to transmit data to and receive data from communications module 210. In one embodiment, master transceiver 214-218 has multiple output ports to communicate with multiple IO-Link devices 232, 252 in a point-to-point configuration, i.e., each port is coupled to one IO-Link device 232, 252. In one embodiment, master transceiver 214-218 operates in a multi-drop system configuration and allows for one or more unauthenticated devices to co-exist with authenticated devices within system 200. IO-Link devices 232, 252 to connect to its ports, which may be analog or digital. Master transceiver 214-218 may be implemented as a single device or embedded into a control module, such as a control cabinet.

In one embodiment, master transceiver 214-218 comprises components that perform security and network processing functions in order to provide inspection of incoming data and establish and maintain secure communication between multiple IO-Link device 232, 252 and PLC 206. In one embodiment, IO-Link device 232, 252 comprises memory to store security-related information, such as a private key that serves as a device identifier, while IO-Link master 214-218 comprises memory to store a public key. Additionally, system 200 may employ a known or custom security protocol. In one embodiment, cryptographic algorithms may be combined with the protocol to ensure the integrity of the communication between IO-Link master 214-218 and IO-Link device 232, 252.

IO-Link device 232, 252 typically is an individual IO-Link instrument, such as a sensor, actuator, or RFID reader that is used, for example, for point-to-point communication between an automation unit and PLC module 202. IO-Link device 232, 252 may have a unique address and may be independently powered and optically isolated. As shown in FIG. 2, IO-Link device 232 comprises IO-Link transceiver 234, microcontroller 236, and sensor element 238, while device 252 comprises IO-Link transceiver 254, micro controller 256, and actuator node 258. IO-Link device 232, 252 may further comprise a signal converter, such as an ADC (not shown), coupled to respective element 238, 258.

Sensor element 238 may include pressure switches, temperature sensors, motion sensors, flow sensors, and the like used in the management of industrial processes. Actuator element 258 is, for example, an electromagnetically activated device (e.g., a motor switch or a solenoid valve) that acts upon a control or instruction command received from master transceiver 218. Actuator 258 may operate on digital or analog signals.

In operation, microcontroller 212 is in communication with IO-Link device 232, 252 and, for example, a host device or controller (not shown) that controls the operations of an industrial process through a control program and/or a human operator. The host device or controller receives status information (e.g., error status) and adjusts device settings (e.g., resets).

Communications module 210, 220 controls IO-Link device 232, 252 in a master/slave configuration by controlling data flow from and to IO-Link device 232, 252. Communications module 210, 220 may be implemented as a card that is configured to couple, via PLC module 202, to the host device or controller. In one embodiment, communications module 210, 220 directly communicates with a communications network (e.g., Ethernet) or user interface.

In one embodiment, IO-Link secure master transceiver 214-218 establishes a secure connection between PLC module 202 and multiple IO-Link devices 232, 252 through which PLC module 202 can initiate communication and securely exchange data with IO-Link device 232, 252. Once master transceiver 214-218 detects a connection to IO-Link device 232, 252 (e.g., at start-up), transceiver 214-218 sends an authorization request, IO-Link device 232, 252 commences transmission of a secret that is embedded in security transceiver 234, 254. Upon successful authentication, IO-Link device 232, 252 initiates data transmission upon detecting a specified event, such as a sensed value exceeding a predetermined threshold level or an error warning. If authenticity cannot be verified, for example, because the secret or encrypted digital response signal cannot be deciphered, master transceiver 214-218 rejects the data transmitted from device 232, 252.

In one embodiment, IO-Link secure master transceiver 214-218 stores settings of IO-Link device 232, 252, such as a transmission rate that is selected based on a known length of the serial link. In one embodiment, IO-Link secure master transceiver 214-218 provides signal conversion functions between communication module 210 and IO-Link device 232, 252.

IO-Link secure transceiver 234, 254 routes signals, such as control commands, to sensor elements 238 and actuator element 258, for example in order to effectuate physical action, and retrieves response signals from element 238, 258. Secure transceivers 214, 218, 234, 254 will be described in more detail with respect to FIG. 3.

One skilled in the art will appreciate that system 200 may comprise additional components necessary for converting, processing, and securing data, such as logic devices, interface devices, power sources, DC/DC converters, memory, and optocouplers known in the art.

Figure 3:
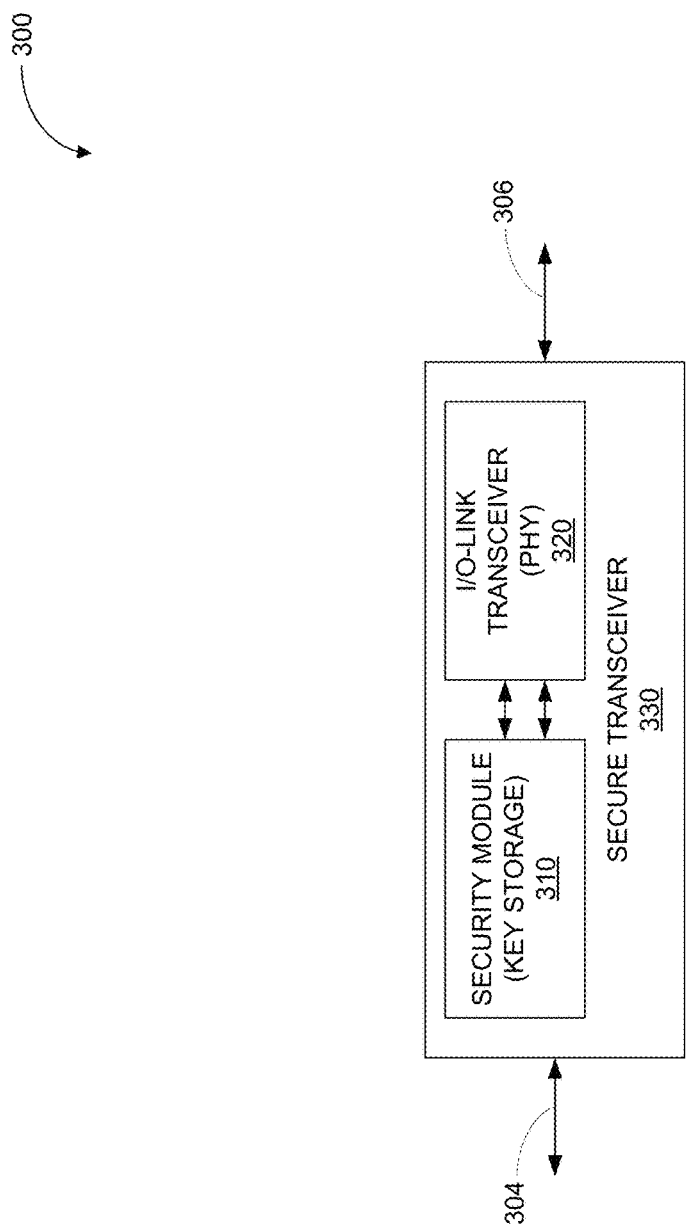
FIG. 3 is an exemplary functional block diagram of a secure transceiver utilizing IO-Link device authentication, according to various embodiments of the invention.

FIG. 3 is an exemplary functional block diagram of a secure transceiver utilizing IO-Link device authentication, according to various embodiments of the invention. Secure transceiver 330 comprises security module 310 and IO-Link transceiver 320. Secure transceiver 330 may be coupled to a communications module, a host controller, or directly to a computer. It is understood that secure transceiver 330 may include a number of additional interfaces, such an interface to an external network (not shown).

In one embodiment, security module 310 is any device configured to process and secure otherwise unsecured digital data. However, this is not intended as a limitation, as certain security functions may be handled by other processors, for example, in devices embedded into transceiver 320. In one embodiment, security module 310 comprises memory that holds, for example, a cryptographic key that is used to encrypt a message or decrypt a secret message.

In one embodiment, security module 310 is implemented into transceiver 320. In another embodiment, security module 310 is provided as a standalone module.

In operation, security module 310 increases security by applying a security operation to data provided to or received from transceiver 320. Security operations include encryption/decryption or authentication of data using public or private keys and other security protocols.

In one embodiment, in order to facilitate a secure communication, secure transceiver 330 receives via port 306 a message with an authorization request, for example from a master transceiver (not shown), and responds to the request, via the same port 306, by transmitting a secret embedded within security module 310, such as a digital signature and/or certificate, to the master transceiver that shares the same secret.

In one embodiment, secure transceiver 330 receives, via port 306, secure data from a sensor (not shown) and inspects the secret in order to authenticate the source of the data and, thus, the validity of the communication. This may be accomplished, for example, by performing a decryption on the secure data by comparing the secret to a secret stored in security module 310 in order to produce an appropriate match. If the authentication procedure fails, the data is deemed invalid and subsequent communication is rejected.

Figure 4:
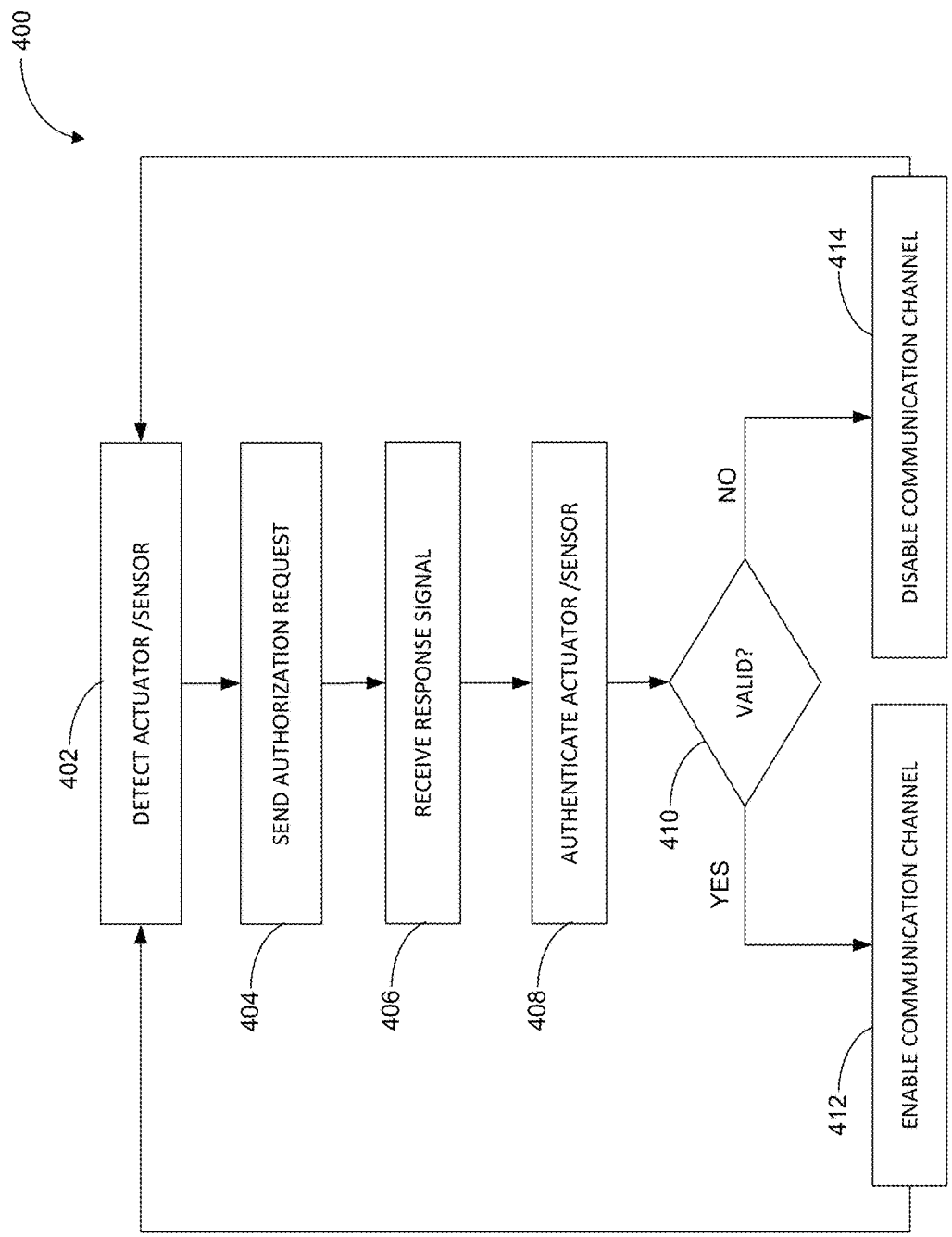
FIG. 4 is a flowchart of an exemplary process for IO-Link device authentication according to various embodiments of the invention.

FIG. 4 is a flowchart of an exemplary process for IO-Link device authentication according to various embodiments of the invention. The process for authentication begins at step 402 by detecting the presence of an actuator device or a sensor device that is connected, for example via a cable, to a communications module.

At step 404, an authorization request is sent, for example, from the communications module to a sensor.

At step 406, a response signal is received, for example, by the communications module from the sensor. In one embodiment, the response signal is converted prior to processing and a security protocol is applied to the response signal.

At step 408, the response signal is used to validate the actuator or sensor. In one embodiment, the communications module determines whether the actuator or sensor is compatible with one or more devices.

At step 410, if it is detected that the response signal is valid, then at step 412 transmission via a communication channel is enabled, for example, by the communications module.

If at step 410 it is detected that the response signal is deemed invalid, then at step 414 communication is disabled.

Finally, the process resumes with step 402.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A process control system to facilitate authentication of Input/Output-Link (IO-Link) devices within a process control network, the system comprising:
   a Programmable Logic Controller (PLC) comprising a plurality of IO paths;
   a serial link coupled to the PLC, the serial link is configured to operate with an IO-Link;
   a plurality of IO-Link devices comprising:
      one of a sensor and an actuator coupled to the serial link;
      an IO-link device secure transceiver that comprises a memory device to store a private key of a private-public key pair; and
      one of an encryption and decryption engine; and
   a PLC compute node coupled to the PLC, the compute node configures one of the sensor and actuator, wherein the serial link comprises an IO-Link secure master transceiver coupled to a programmable microcontroller, the IO-Link secure master transceiver comprises a memory device to store a public key of the private-public key pair and is configured to send an authorization request to one of the sensor and actuator, wherein the IO-Link secure transceiver and the IO-Link secure master transceiver use the private and public keys in a cryptographic operation to data provided to or received from the IO-Link secure transceiver or the IO-Link secure master transceiver.

2. The system according to claim 1, wherein the IO-Link secure master transceiver comprises multiple output ports to communicate secure data with multiple IO-Link secure transceiver devices in a point-to-point configuration.

3. The system according to claim 1, wherein the IO-Link secure device transceiver comprises one of an encryption and decryption engine.

4. The system according to claim 1, wherein the IO-Link secure master transceiver is configured to operate with both authenticated and unauthenticated IO-Link devices.

5. The system according to claim 1, wherein the programmable microcontroller is electrically isolated by an optocoupler.

6. The system according to claim 1, wherein the serial link generates security and authentication functions that enable secure communication with one of the sensor and actuator via a communication channel.

7. The system according to claim 6, wherein the communication channel is a three-conductor cable.

8. A method to authenticate an Input/Output-Link (IO-Link) device, the method comprising:
   detecting the presence of one of a sensor and actuator that comprises an IO-Link secure transceiver;
   sending an authorization request from an IO-Link secure master transceiver to one of the sensor and actuator that comprises a memory device to store a private key of a private-public key pair, the IO-Link secure master transceiver comprising a memory device to store a public key of the private-public key pair, the IO-Link secure transceiver and the IO-Link secure master transceiver using the private and public keys in a cryptographic operation to data provided to or received from the IO-Link secure transceiver or the IO-Link secure master transceiver;
   receiving a response signal from an IO-Link device comprising an IO-link device secure transceiver, one of an encryption and decryption engine, and one of the sensor and actuator in response to the authorization request;
   validating one of the sensor and actuator in the IO-Link device based on the response signal to determine whether one of the sensor and actuator is compatible with another device; and
   enabling a transmission via a communication channel in response to detecting that the response signal is valid.

9. The method according to claim 8, further comprising disabling the transmission via the communication channel in response to detecting that the response signal is invalid.

10. The method according to claim 8, wherein sending the authorization request comprises sending secret data.

11. The method according to claim 8, wherein validating comprises applying a security protocol to enabling the transmission.

12. The method according to claim 8, further comprising converting the response signal prior to processing.

13. The method according to claim 8, wherein one of the sensor and actuator is enabled by a communications module.

14. The method according to claim 8, further comprising transmitting encrypted data between one of the sensor and actuator and a master transceiver.

15. A device to authenticate an Input/Output-Link (IO-Link) device, the device comprising:
   a first IO-Link secure transceiver configured to communicate with a programmable microcontroller, the first IO-Link secure transceiver being configured to send an authorization request to a plurality of IO-Link devices each comprising one of a sensor and an actuator that comprises a second IO-Link secure transceiver, the second IO-Link secure transceiver comprising a memory device to store a private key of the private-public key pair, the IO-Link secure transceiver and the IO-Link secure master transceiver using the private and public keys in a cryptographic operation to data provided to or received from the IO-Link secure transceiver or the IO-Link secure master transceiver; and
   an authentication module configured to secure data that is transmitted to, or received in response to the authorization request, from the second IO-Link secure transceiver, the authentication module is configured to use the private key and a public key to provide one of an encryption processing and a decryption processing of the data, the authentication module further configured to validate one of the sensor and actuator based on the response signal and determine whether one of the sensor and actuator is compatible with another device.

16. The device according to claim 15, wherein the data comprises one of diagnostic data, status data, and messages communicated using a protocol.

17. The device according to claim 15, wherein the first TO-Link secure transceiver is embedded in a control module.

18. The device according to claim 15, wherein the programmable microcontroller comprises memory that is configured to store data transmitted over a serial link.

* * * * *